United States Patent [19]

Ogawa et al.

[11] 4,154,895
[45] May 15, 1979

[54] MAGNETIC RECORDING MEMBER

[75] Inventors: Hiroshi Ogawa; Masashi Aonuma; Matsuaki Nakamura; Yasuo Tamai, all of Odawara, Japan

[73] Assignee: Fuji Photo Film Co., Ltd., Minami-ashigara, Japan

[21] Appl. No.: 862,330

[22] Filed: Dec. 20, 1977

[30] Foreign Application Priority Data

Dec. 21, 1976 [JP] Japan ................ 51-154491

[51] Int. Cl.$^2$ ............................................. H01F 10/02
[52] U.S. Cl. .............................. 428/425; 252/62.54; 360/131; 360/134; 360/135; 360/136; 428/423; 428/539; 428/900
[58] Field of Search ............... 360/131, 134, 135, 136; 364/135, 136, 137, 138; 428/900, 539, 425; 252/62.54, 62.56; 427/127-132

[56] References Cited

U.S. PATENT DOCUMENTS

4,049,871  9/1977  Ogasa et al. .................... 428/900

*Primary Examiner*—Stanley S. Silverman

*Attorney, Agent, or Firm*—Sughrue, Rothwell, Mion, Zinn and Macpeak

[57] ABSTRACT

In a magnetic recording member comprising a non-magnetic support having provided thereon a magnetic layer comprising finely divided ferromagnetic powders dispersed in a binder, in which the binder comprises about 10 to about 70 wt% of (a) a polyester-polyurethane resin and about 30 to about 90 wt% of (b) a synthetic non-drying oil modified alkyd resin and (c) a polyisocyanate, wherein the molar ratio of the isocyanate groups present in the polyisocyanate (c) to the hydroxyl groups present in the synthetic non-drying oil-modified alkyd resin (b) ranges from about 0.8:1 to about 2.0:1. The binder system in accordance with the present invention provides excellent magnetic properties, particularly improved squareness ratio and 5 MHz output. The binder system of the present invention also enables the use of finely divided ferromagnetic alloy powders, with excellent magnetic properties being maintained when magnetic recording members are produced therefrom.

9 Claims, No Drawings

MAGNETIC RECORDING MEMBER

BACKGROUND OF THE INVENTION

1. Field of the Invention

The present invention relates to a magnetic recording member, and more particularly, to a magnetic recording member exhibiting excellent surface properties, orientation property (squareness ratio), abrasion resistance as well as high output. 2. Description of the Prior Art Magnetic recording members, particularly video tapes and the like, must possess excellent surface properties so that spacing loss can be reduced in order to record high frequency signals having a recording wavelength of about 2 microns. At the same time, magnetic recording members must possess excellent durability since magnetic recording members when used as video tapes are subjected to a large amount of rubbing by a video head. In addition, the dispersibility of ferromagnetic powders must be good and the squareness ratio must be large, etc., in order to obtain high output. For these purposes, a variety of binder compositions have hitherto been proposed. However, no composition which satisfies the above indicated requirements has been obtained up to now.

In particular, a large amount of activity has recently occurred in developing high density magnetic recording members using finely divided ferromagnetic alloy powders as ferromagnetic powders. However, these finely divided alloy powders have poor dispersibility in conventional binder compositions and it has been particularly difficult to obtain magnetic recording members having high output.

SUMMARY OF THE INVENTION

A variety of binder compositions have now been investigated in order to improve the dispersion of finely divided alloy powders and as a result it has now been found that, when using a binder composition comprising a polyester-polyurethane resin, a synthetic non-drying oil-modified alkyd resin and a polyisocyanate, high density magnetic recording memgers having excellent dispersability and a high output are obtained. The present invention has thus been attained.

A first object of the present invention is to provide a novel magnetic recording member.

A second object of the present invention is to provide a magnetic recording member having a smooth surface.

A third object of the present invention is to provide a magnetic recording member having a large squareness ratio.

A fourth object of the present invention is to provide a magnetic recording member having good abrasion resistance.

A fifth object of the present invention is to provide a magnetic recording member having a high output.

That is, the present invention provides a magnetic recording member comprising a non-magnetic support having thereon a magnetic layer comprising ferromagnetic powders dispersed in a binder, wherein the binder comprises about 10 to about 70 wt% of (a) a polyester-polyurethane resin and about 30 to about 90 wt% of (b) a synthetic non-drying oil-modified alkyd resin and (c) a polyisocyanate, wherein the molar ratio of the isocyanate groups present in the polyisocyanate (c) to the hydroxyl groups present in the synthetic non-drying oil-modified alkyd resin (b) ranges from about 0.8:1 to about 2.0:1.

DETAILED DESCRIPTION OF THE INVENTION

Examples of polyester-polyurethane resins which can be used in accordance with the present invention comprise the reaction product of polyester-polyols and diisocyanates. Polyester-polyols are obtained by the condensation reaction of dicarboxylic acids and diols, or the ring-opening polymerization of lactones. Catalysts are employed in these reactions, where necessary. A suitable molecular weight for the polyester-polyurethane resin used in this invention preferably is about 20,000 to about 200,000, most preferably 30,000 to 150,000. A preferred example of a polyester-polyurethane resin is the polyester-polyurethane resin obtained from ethylene adipate or butylene adipate urethanated with tolylene diisocyanate or 4,4'-diphenylmethane diisocyanate. Polyester-polyurethane resins can be produced using the techniques disclosed in U.S. Pat. Nos. 2,933,477, 2,933,478 and 2,878,236 and J. H. Saunders & K. C. Frisch, *Polyurethanes Chemistry & Technology*, Parts I & II, Interscience Publishers.

Specific examples of dicarboxylic acids include saturated aliphatic dicarboxylic acids (e.g., having 4 to 10 carbon atoms, preferably 5 to 8, most preferably 6 carbon atoms) such as oxalic acid, succinic acid, glutaric acid, adipic acid, pimellic acid, suberic acid, azelaic acid, sebacic acid, isosebacic acid, etc., unsaturated aliphatic dicarboxylic aicds such as maleic acid, fumaric acid, etc., aromatic dicarboxylic acids (e.g., having 8 to 12 carbon atoms, preferably 8 carbon atoms) such as phthalic acid, isophthalic acid, etc., dimer acids obtained by dimerization of unsaturated aliphatic dicarboxylic acids, etc. The dicarboxylic acids can be employed individually or as a mixture of two or more thereof.

Examples of suitable diols which can be used include saturated aliphatic diols (e.g., having 2 to 8 carbon atoms), such as ethylene glycol, diethylene glycol, triethylene glycol, propylene glycol, butylene glycol, etc., and aromatic diols, such as bis-hydroxyethoxybenzene, 4,4'-diphenylmethane diol, etc. The diols can be used individually or as a mixture of two or more kinds thereof.

Suitable lactones include those having, e.g., 4 to 8 carbon atoms, preferably 4 to 6, most preferably 6 carbon atoms, such as γ-butyrolactone, α-pyrone, ε-caprolactone, α-methyl-ε-caprolactone, etc. These lactones also can be used individually or as a mixture of two or more thereof.

Exemplary diisocyanates which can be employed include, e.g., aromatic diisocyanates, such as tolylene diisocyanate, m-xylylene diisocyanate, p-phenylene diisocyanate, 1,5-naphthalene diisocyanate, hexamethylene diisocyanate, 4,4'-diphenylmethane diisocyanate, etc. 2,4- or 2,6-tolylene diisocyanate and 4,4'-diphenylmethane diisocyanate are preferred. The diisocyanates can be employed individually or as a mixture of two or more thereof.

Catalysts which are employed in these reactions include triethylamine, triethylenediamine, 3,3'-dichloro-4,4'-diaminodiphenylmethane, cobalt naphthenate, benzyl trimethyl ammonium hydroxide, stannous chloride, tetra-n-butyl tin, stannic chloride, tri-n-butyl tin acetate, n-butyl tin trichloride, dimethyl tin dichloride, dibutyl tin dilaurate, etc. Of these catalysts, 3,3'-dichloro-4,4'-diaminodiphenylmethane is particularly preferred.

The term "synthetic non-drying oil-modified alkyd resin", which is employed in the present invention, is used herein to describe an alkyd resin synthesized by reaction of polycarboxylic acids, polyols and either synthetic non-drying oils and synthetic non-drying oil glycidyl esters or a mixture of both. Synthetic non-drying oil-modified alkyd resins are described in detail in I. L. Wangsness, "Paint and Oil", *Chem. Rev.*, Dec. 2, (1954) and H. W. Chatfield, *Varnish Manufacture and Plants*, Leonald Hill Ltd. Most preferred synthetic non-drying oil-modified alkyd resins are synthesized from the glycidyl esters of Koch aliphatic carboxylic acids (described below), glycerin and phthalic acid, where the glycidyl esters of Koch aliphatic carboxylic acids are produced by reacting Koch aliphatic carboxylic acids and epichlorohydrin.

Specific examples of polycarboxylic acids which can be used include saturated polycarboxylic acids such as phthalic acid or anhydride, terephthalic acid, isophthalic acid, succinic acid, adipic acid, sebacic acid, etc.; unsaturated polycarboxylic acids such as maleic acid, maleic anhydride, fumaric acid, itaconic acid, citraconic anhydride, etc.; polycarboxylic acids obtained by a Diels-Alder reaction such as a cyclopentadiene-maleic anhydride addition product, a terpene-maleic anhydride addition product, a rosin-maleic anhydride addition product etc. Dicarboxylic acids are preferred and phthalic acid is particularly preferred.

Specific examples of polyhydric alcohols which can be used include dihydric alcohols such as ethylene glycol, diethylene glycol, triethylene glycol, propylene glycol, trimethylene glycol, tetramethylene glycol, etc.; trihydric alcohols such as glycerin, trimethylol propane, etc.; polyhydric alcohols such as diglycerin, triglycerin, pentaerythritol, dipentaerythritol, mannitol, sorbitol, etc. Ethylene glycol, glycerin and trimethylol propane are preferred.

Suitable synthetic non-drying oils which can be employed include synthetic aliphatic carboxylic acids such as paraffin oxidized aliphatic carboxylic acids either obtained by the liquid phase oxidation of n-paraffins with air in the presence of an Mn type catalyst; Ziegler aliphatic carboxylic acids obtained by carboxylating a trialkyl aluminum obtained by addition polymerization of triethyl aluminum and ethylene stepwise in accordance with the Ziegler method, with $CO_2$ followed by hydrolysis or controlled oxidation of Ziegler alcohols; oxo aliphatic carboxylic acids obtained by the liquid phase oxidation of either oxo aldehydes or oxo alcohols which are obtained from olefins in accordance with the oxo method; Koch aliphatic carboxylic acids obtained by adding CO to olefins in the presence of an acid catalyst in accordance with the Koch method, and the like.

A preferred range of the number of carbon atoms in these synthetic aliphatic acids is 8 to 22, more preferably 8 to 14.

Koch aliphatic acids are particularly preferred as the synthetic non-drying oils employed in accordance with the present invention. This is believed because, unlike other synthetic aliphatic acids, Koch aliphatic acids have a carboxyl group attached directly to the tertiary carbon atom thereof.

The term "synthetic non-drying oil glycidyl ester" as used herein refers to those esters obtained by reacting an epihalohydrin such as epichlorohydrin with synthetic non-drying oils obtained in accordance with the above described methods and the like, etc.

Glycidyl esters of Koch aliphatic carboxylic acids are particularly preferred as the synthetic non-drying oil glycidyl esters. Glycidyl esters of Koch aliphatic carboxylic acids having from 8 to 14 carbon atoms are more preferred.

The synthetic non-drying oil-modified alkyd resins which are employed in accordance with the present invention have an acid value of less than about 10, preferably less than 5, and have a hydroxyl value of from about 50 to about 200, preferably 80 to 170. With an acid value of greater than about 10, the pot life of the magnetic coatings obtained is shortened, which is not preferred. With a hydroxyl value of less than about 50, the coated layers obtained are overly soft; and with a hydroxyl value of greater than about 200, the coated layers are overly hard, which is not preferred.

Suitable polyisocyanates which are employed in accordance with the present invention include adducts of diisocyanates and trihydric polyols, pentamers of diisocyanates and the product obtained by reaction of 3 mols of diisocyanate and 1 mol of water accompanied by decarboxylation. Suitable diisocyanates which can be used include tolylene diisocyanate, xylylene diisocyanate, hexamethylene-diisocyanate, etc. Suitable trihydric polyols which can be used include those hereinbefore described.

Specific examples of polyisocyanates include an adduct of 3 mols of tolylene diisocyanate and 1 mol of trimethylol propane, an adduct of 3 mols of m-xylylene diisocyanate and 1 mol of trimethylol propane, a pentamer of tolylene diisocyanate, a pentamer composed of 3 mols of tolylene diisocyanate and 2 mols of hexamethylene diisocyanate, the products obtained by reacting 3 mols of hexamethylene diisocyanate and 1 mol of water accompanied by decarboxylation, and the like, which are easily obtained on an industrial scale.

The mixing ratio of these polyester-polyurethane resins, synthetic non-drying oil-modified alkyd resins and polyisocyanates is such that the molar ratio of the isocyanate groups present in the polyisocyanate to the hydroxyl groups present in the synthetic non-drying oil-modified alkyd resin, NCO/OH, is about 0.8 to about 2.0, preferably 1.0 to 1.8. With a molar ratio below about 0.8, the magnetic layer obtained becomes brittle so that not only is durability deteriorated but also blocking tends to occur easily due to the remaining hydroxyl groups, which is not preferred. With a molar ratio exceeding about 2.0, the magnetic layer becomes overly hard so that adhesion between the magnetic layer and the support decreases and the magnetic layer is scraped off, which is not preferred.

The proportion of the polyester-polyurethane to the total weight of the binder is about 10 to about 70 wt%, preferably 20 to 40 wt%. If the proportion of the polyester-polyurethane is less than about 10 wt%, the dispersibility of the magnetic powders is somewhat improved on one hand, but on the other hand, durability is lost. If the proportion of the polyester-polyurethane exceeds about 70 wt%, the dispersibility of magnetic powders is deteriorated, which is not preferred.

The magnetic recording member of the present invention is prepared by coating a magnetic composition comprising ferromagnetic powders dispersed in a binder followed by drying.

The details of processes for producing magnetic coatings are described in Japanese Patent Publication Nos. 15/60, 26794/64, 186/68, 28043/72, 28048/72, 31445/72, 11162/73, 21331/73 and 33683/73, USSR Patent 308,033, and U.S. Pat. Nos. 2,581,414, 2,855,156, 3,240,621, 3,526,598, 3,728,262, 3,790,407 and 3,836,393, and the like. The magnetic coatings as described in these patents are mainly composed of ferromagnetic powders, binders and coating solvents, and, in addition thereto, sometimes contain additives such as a dispersing agent, a lubricant, an abrasive, an antistatic agent, and the like.

Typical examples of ferromagnetic finely divided powders which can be used in accordance with the present invention include ferromagnetic iron oxides, ferromagnetic chromium dioxides, ferromagnetic alloy powders and the like.

Suitable ferromagnetic iron oxides are ferromagnetic iron oxides represented by the general formula:

$$FeO_x$$

wherein x is between 1.33 and 1.50, both inclusive; that is, maghemite ($\gamma$-$Fe_2O_3$, X=1.50), magnetite ($Fe_3O_4$, x=1.33) and Berthollide compounds thereof ($FeO_x$, 1.33<x<1.50). The x value described above is represented by the following equation:

$$x = 1/(2 \times 100) \times \{2x(A) + 3x(B)\}$$

wherein
A: atomic % of divalent iron ions
B: atomic % of trivalent iron ions

Divalent metals may also be added to these ferromagnetic iron oxides. Specific examples of these divalent metals are Cr, Mn, Co, Ni, Cu, Zn and the like; which can be added in a range of from 0 to about 10 atomic % to the iron oxides described above.

Examples of ferromagnetic chromium dioxides described above are $CrO_2$ and $CrO_2$ to which metals such as Na, K, Ti, V, Mn, Fe, Co, Ni, Te, Ru, Sn, Ce, Pb or the like, semi-conductors such as P, Sb, Te, or the like, or oxides of these metals are added in an amount of 0 to about 20 wt%.

An effective acicular ratio of the above described ferromagnetic iron oxides and ferromagnetic chromium dioxides is about 2:1 to about 20:1 and the average length thereof is about 0.2 to about 2.0 um.

The ferromagnetic alloy powders described above contain a metal component in an amount above about 75 wt%, with about 80 wt% or more of the metal component being at least one ferromagnetic metal (that is, Fe, Co, Ni, Fe-Co, Fe-Ni, Co-Ni or Co-Ni-Fe), and about 20 wt% or less of the metal component, preferably 0.5 to 5 wt%, being, e.g., Al, Si, Y, Mo, Rh, Pd, Ag, Sn, Sb, Te, Ba, Ta, W, Re, Au, Hg, Pb, Bi, La, Ce, Pr, Nd, B, P, and the like, which ferromagnetic alloy powders sometimes further contain a small amount of water, hydroxides or oxides.

The above described ferromagnetic alloy powders have a particle size of about 50 to about 1000 Å and are acicular particles comprising 2 to 20 particles linked in the form of a chain.

Ferromagnetic powders are described specifically in Japanese Patent Publication Nos. 5515/61, 4825/62, 5009/64, 10307/64, 14090/69, 18372/70, 22062/72, 22513/72, 28466/71, 38755/71, 4286/72, 12422/72, 17284/72, 18509/72, 18573/72 and 39639/73, U.S. Pat. Nos. 3,026,215, 3,031,341, 3,100,194, 3,242,005 and 3,389,014, British Pat Nos. 752,659, 782,762 and 1,007,323, French Patent 1,107,654, German Patent Application (OLS) No. 1,281,334, etc.

The ratio of the ferromagnetic powders to the binder composition of this invention employed is a weight ratio of about 10 to about 40 parts by weight of binder, particularly preferably 25 to 75 parts by weight, to 100 parts by weight of the ferromagnetic powders.

A dispersing agent, a lubricant, an abrasive, an antistatic agent and the like may also be added as additives to the magnetic recording layers, in addition to the above-described binder and ferromagnetic finely divided powders.

Specific examples of dispersing agents which can be employed in the magnetic recording layer in accordance with the present invention are aliphatic carboxylic acids having 12 to 18 carbon atoms (e.g., of the formula $R_1COOH$, wherein $R_1$ is an alkyl or alkenyl group having 11 to 17 carbon atoms) such as caprylic acid, capric acid, lauric acid, myristic acid, palmitic acid, stearic acid, oleic acid, elaidic acid, linolic acid, linoleic acid, stearolic acid, and the like; metallic soaps comprising alkali metal (Li, Na, K, etc.) or alkaline earth metal (Mg, Ca, Ba, etc.) salts of the above described aliphatic carboxylic acids; fluorine containing compounds of the above-described aliphatic carboxylic acid esters; amides of the above-described aliphatic carboxylic acids; polyalkylene oxide alkyl phosphates; lecithin; trialkyl polyolefinoxy quaternary ammonium salts (wherein the alkyl group has 1 to 5 carbon atoms, and the olefin is exemplified by ethylene, propylene, etc); and the like. In addition, higher alcohols having more than 12 carbon atoms and the sulfuric acid esters thereof and the like can also be employed. These dispersing agents are employed in an amount of from about 0.5 to about 20 parts by weight per 100 parts by weight of the binder. These dispersing agents are described in detail in Japanese Patent Publication Nos. 28369/64, 17945/69, 7441/73, 15001/73, 15002/73, 16363/73 and 4121/75, U.S. Pat. Nos. 3,387,993 and 3,470,021, etc.

Typical lubricants which can be employed in the magnetic recording layer in accordance with the present invention include finely divided electrically conductive powders such as graphite, etc.; finely divided inorganic powders such as molybdenum disulfide, tungsten disulfide and the like; finely divided synthetic resin powders such as those of polyethylene, polypropylene, polyethylene-vinyl chloride copolymers, polytetrafluoroethylene and the like; α-olefin polymers; unsaturated aliphatic hydrocarbons which are liquid at normal temperature (compounds in which an n-olefin double bond is positioned at the terminal thereof, with about 5 to about 20 carbon atoms); aliphatic acid esters of aliphatic monocarboxylic acids having 12 to 20 carbon atoms and monovalent alcohols having 3 to 12 carbon atoms, and the like. These lubricants can be employed at about 0.2 to about 20 parts by weight per 100 parts by weight of the binder, and are described in detail in Japanese Patent Publication Nos. 18064/66, 23889/68, 40461/71, 15621/72, 18482/72, 28043/72, 32001/72 and 5042/75, U.S. Pat. Nos. 3,470,021, 3,492,235, 3,497,411, 3,523,086, 3,625,760, 3,630,772 and 3,642,539, *IBM Technical Disclosure Bulletin*, Vol. 9, No. 7, page 779 (December, 1966), *ELEKTRONIK*, 1961, No. 12, page 380, etc.

Specific examples of abrasives which can be employed in the magnetic recording layer in accordance with the present invention are those generally employed, which include fused alumina, silicon carbide, chromium dioxide, corrundum, artificial corrundum, diamond, artificial diamond, garnet, emery (with the main components being corrundum and magnetite), and the like. These abrasives have a Moh's hardness above about 5. Preferably the abrasives employed have an average particle size of about 0.05 to about 5μ, more preferably 0.1 to 2μ. These abrasives are employed in an amount of about 0.5 to about 20 parts by weight per 100 parts of the binder. These abrasives are described in detail in Japanese Patent Publication Nos. 18572/72, 15003/73, 15004/73 (corresponding to U.S. Pat. No. 3,617,378), 39402/74 and 9401/75, U.S. Pat. Nos. 3,007,807, 3,041,196, 3,293,066, 3,630,910 and 3,687,725, British Pat. No. 1,145,349, German Patent Application (DT-PS) Nos. 853,211 and 1,101,000, and the like.

Typical examples of antistatic agents which can be employed in the magnetic recording layer in accordance with the present invention include finely divided electrically conductive powders such as carbon black, carbon black graft polymers and the like; natural surface active agents such as saponin, etc.; nonionic surface active agents such as alkylene oxide type, glycerin type, glycidol type and like surface active agents; cationic surface active agents such as higher alkyl amines, quaternary ammonium salts, pyridines or other heterocyclic compounds, phosphoniums or sulfoniums and the like; anionic surface active agents containing an acidic group derived from a carboxylic acid group, a sulfonic acid group or a phosphoric acid group, a sulfuric acid ester group, a phosphoric acid ester group and the like; amphoteric surface active agents such as sulfuric acid esters or phosphoric acid esters, etc., of amino acids, aminosulfonic acids, amino alcohols and the like.

The above-described finely divided electrically conductive powders can be employed in an amount of about 0.2 to about 20 parts by weight per 100 parts of the binder, and the surface active agents can be used in an amount of from about 0.1 to about 10 parts by weight per 100 parts by weight of the binder.

These electrically conductive finely divided powders which can be employed as antistatic agents and a some surface active agents are described in Japanese Patent Publication Nos. 22726/71, 24881/72, 26882/72, 15440/73, and 26761/73, U.S. Pat. Nos. 2,271,623, 2,240,472, 2,288,226, 2,676,122, 2,676,924, 2,676,975, 2,691,566, 2,727,860, 2,730,498, 2,742,379, 2,739,891, 3,068,101, 3,158,484, 3,201,253, 3,210,191, 3,294,540, 3,415,649, 3,441,413, 3,442,654, 3,475,174 and 3,545,974 German Patent Application (OLS) No. 1,942,665, British Pat. Nos. 1,077,317 and 1,198,450, etc., and in references such as Ryohei Oda, et al., *Kaimen Kasseizai no Gosei to sono Oyo* (*Synthesis and Application of Surface Active Agents*), published by Maki Shoten, Tokyo (1964), A. M. Schwartz and J. W. Perry, *Surface Active Agents*, published by Interscience Publications Inc. (1958), J. P. Sisley, *Encyclopedia of Surface Active Agents*, Vol. 2, published by Chemical Publishing Co. (1964), *Kaimen Kasseizai Binran* (*Handbook of Surface Active Agents*), Sixth Ed., published by Sangyo Tosho Kabushiki Kaisha, Japan (Dec. 20, 1966), etc.

These surface active agents can be incorporated individually or as a mixture. These surface active agents are also employed as antistatic agents, but, can also be used, in some cases, for other purposes, for example, for improving the dispersion, improving magnetic properties, improving lubricating properties, or as a coating aid.

The magnetic recording layers in the present invention are coated onto a non-magnetic support using a coating composition obtained by dissolving or dispersing the above-described composition in an organic solvent, kneading and dispersing the mixture, followed by drying after coating with the magnetic recording layers thus being formed. The magnetic recording layers can also be subjected to an orientation treatment to orient the magnetic powders in the respective magnetic layers after coating but before drying. Further, a surface smoothening treatment for the respective magnetic layers can also be carried out after drying.

Materials which can be used for the non-magnetic support include polyesters such as polyethylene terephthalate, polyethylene-2,6-naphthalate and the like; polyolefins such as polypropylenes and the like; cellulose derivatives such as cellulose triacetate, cellulose diacetate, and the like; synthetic resins such as polycarbonates and the like, non-magnetic metals such as Cu, Al, Zn and the like; ceramic materials such as glass, porcelain, ceramics and the like.

The non-magnetic supports can be in the form of films, tapes, sheets, discs, cards, drums and the like and depending upon the form, a variety of materials can be chosen as desired.

A suitable thickness for the non-magnetic support is about 2 to about 50 μm in the case of films, tapes and sheets, preferably 3 to 25 μm, and, in the case of discs and cards, about 0.5 to about 10 μm. With a drum shape, the shape is cylindrical and the type is determined depending upon the recorder used.

The surface of the above-described non-magnetic support opposite the side having the magnetic layers can also be coated (so-called back coating) for purposes of preventing the generation of static electricity, preventing print through, preventing wow and flutter, etc., in the case of flexible supports such as films, tapes, sheets, thin flexible discs and the like.

Details of back coating are disclosed in, for example, U.S. Pat. Nos. 2,804,401, 3,293,066, 3,617,378, 3,062,676, 3,734,772, 3,476,596, 2,643,048, 2,803,556, 2,887,462, 2,923,642, 2,997,451, 3,007,892, 3,041,196, 3,115,420, 3,106,688 and 3,761,311, etc.

The ferromagnetic powders as well as the binder of the present invention, a dispersing agent, a lubricant, an abrasive, an antistatic agent, a solvent and the like are kneaded to form a magnetic coating composition.

Upon kneading, the ferromagnetic powders and respective components described above are charged in a kneading machine, simultaneously or sequentially. For instance, one method comprises adding the ferromagnetic powders to a solvent containing a dispersing agent, and continuing to knead the mixture for a definite period of time to form a magnetic coating composition.

A variety of kneading machines can be employed to knead and disperse the magnetic coating composition. For instance, a two roll mill, a three roll mill, a ball mill, a pebble mill, a Trommel mill, a sand grinder, an Azegvari attriter, a high speed impeller, a high speed stone mill, a high speed impact mill, a disper, a kneader, a high speed mixer, a homogenizer, an ultrasonic dispersing machine, and the like.

Techniques which can be used herein relating to kneading and dispersing are described in T. C. Patton, *Paint Flow and Pigment Dispersion*, published by John Wiley & Sons Inc. (1964). These techniques are also described in U.S. Pat. Nos. 2,581,414 and 2,885,156.

Suitable methods for coating the above-described magnetic recording layers onto a support, which can be utilized, include air doctor coating, blade coating, air knife coating, squeeze coating, immersion coating, reverse roll coating, transfer roll coating, gravure coating, kiss coating, cast coating, spray coating and the like. Other methods can also be utilized, if desired. Specific descriptions of these techniques are set forth in detail in *Coating Kogaku* (*Technology of Coating*), pages 253–277, (published March 20, 1971), published by Asakura Shoten, Tokyo. Where a single magnetic recording layer is employed, a suitable coating thickness on a dry basis preferably ranges from about $2\mu$ to $15\mu$. Where a multi-layer magnetic recording layer is employed, a suitable coating thickness on a dry basis for the lower layer preferably ranges from about $2\mu$ to about $15\mu$ and for the upper layer preferably ranges from about 0.5 to about $2\mu$.

The magnetic recording member in accordance with the present invention is provided by coating a magnetic layer on a non-magnetic support according to the above-described coating methods and then drying the coated layer. Further, this step can be repeated and a dual magnetic layer can also be provided by a continuous coating operation. In addition, a dual magnetic layer can also be provided simultaneously using a multi-layer simultaneous coating technique, as described in Japanese Patent Application (OPI) No. 98803/73 (corresponding to German Patent Application (DT-OS) No. 2,309,159), Japanese Patent Application (OPI) No. 99233/73 (corresponding to German Patent Application (DT-OS) No. 2,309,158), etc.

Specific examples of organic solvents which can be employed in coating include ketones such as acetone, methyl ethyl ketone, methyl isobutyl ketone, cyclohexanone, etc.; alcohols such as methanol, ethanol, propanol, butanol, etc.; esters such as methyl acetate, ethyl acetate, butyl acetate, ethyl lactate, glycol acetate monoethyl ether, etc.; ethers and glycol ethers such as diethyl ether, glycol dimethyl ether, glycol monoethyl ether, dioxane, etc.; aromatic hydrocarbons such as benzene, toluene, xylene, etc.; chlorinated hydrocarbons such as methylene chloride, ethylene chloride, carbon tetrachloride, chloroform, ethylene chlorohydrin, dichlorobenzene, etc.

After coating, it is preferred to smoothen the surface of the undried magnetic layer further using a smoothening coil, a smoothening blade, a smoothening blanket or the like, before drying.

The thus provided magnetic layer which is coated onto a support using such a method is dried, after the magnetic powders in the layer are subjected to orientation treatment as described hereinbefore, if desired. Further, if desired, the surface is smoothened, or it is cut into a desired shape to thereby prepare the magnetic recording member of the present invention. Particularly in the present invention, it was found that if the surface of the magnetic recording layer was subjected to a surface smoothening treatment, a magnetic recording member having a smooth surface and having excellent abrasion resistance is obtained.

The magnetic field used for orientation can have a strength of about 500 to about 2,000 gauss, either using an alternating current or a direct current magnetic field. A suitable drying temperature for the magnetic layer is about 50° to about 120° C., preferably 70° to 100° C., more preferably 80° to 90° C.; using air at a flow rate of about 1 to 5 kl/m², preferably 2 to 3 kl/m²; and with a drying time of about 30 seconds to about 10 minutes, preferably 1 to 5 minutes.

The direction for orientation of the ferromagnetic powders is determined depending upon the utility of the magnetic recording medium. That is, in the case of an audio tape, a compact video tape, a memory tape, or the like, the orientation direction is parallel to the longitudinal direction of the tape; in the case of a broadcasting video tape or the like, the orientation is at an angle of about 30° to 90° to the longitudinal direction of the tape.

The methods for orientation of the ferromagnetic powders are also described in, for example, U.S. Pat. Nos. 1,949,840, 2,796,359, 3,001,891, 3,172,776, 3,416,949, 3,473,960 and 3,681,138, Japanese Patent Publication Nos. 3427/57, 28368/64, 23624/65, 23625/64, 13181/65, 13043/73 and 39722/73, etc.

Further, as described in German Patent Application (DT-AS) No. 1,190,985, the orientations can be at different directions in the upper layer and in the lower layer.

The surface smoothening treatment of the respective magnetic layer described above subsequent to drying can be carried out by calendering, abrasion treatment, or the like.

In case of calendering, a super calendering method which comprises passing the magnetic recording member between two rolls such as a metal roll and a cotton roll or a synthetic resin (e.g., nylon) roll, etc., is preferred. Preferred conditions for super calendering are a pressure between rolls of about 25 to about 100 kg/cm, preferably 30 to 70 kg/cm; a temperature of about 35° to about 100° C., preferably 40° to 80° C., and a treating speed of about 5 to about 120 m/min. If the temperature and the pressure exceed the upper limits set forth above, adverse influences are encountered in the magnetic layers and non-magnetic support. Further, if the treating speed is smaller than about 5 m/min, no surface smoothening effect is obtained, and with a treating speed exceeding about 120 m/min, operational procedures are difficult to accomplish.

These methods for surface smoothening are described in U.S. Pat. Nos. 2,688,567, 2,998,325 and 3,783,023, German Patent Application (DT-OS) No. 2,405,222, Japanese Patent Application (OPI) Nos. 53631/74 and 10337/75, etc.

By use of the binder composition in accordance with the present invention, smoothness, the squareness ratio and durability of the magnetic recording member in which ferromagnetic iron oxide powders are used as ferromagnetic powders are improved, and it has also been found that smoothness, squareness ratio and durability of the magnetic recording member in which finely divided ferromagnetic alloy powders are employed, improvements in which have not been achieved before, are also remarkably improved. In addition, it has been found that the binder composition of the present invention has the effect of decreasing the deterioration of finely divided ferromagnetic alloy powders due to oxidation thereof.

The present invention is explained in more detail hereinafter with reference to some examples and comparison examples. It will be easily understood by one skilled in the art that the components, ratios, operational procedures and the order thereof and the like can be modified without departing from the scope and spirit of the present invention. Accordingly, the present invention is not to be construed as being limited to the examples indicated hereinbelow.

The measurements used in the examples and comparison examples are explained below.

(a) Surface Gloss

The reflectance at an angle of incidence of 45° and at an angle of reflection of 45° is measured with a standard gloss meter. The reflectance of a standard CrO2 tape is set at 150.

Measurement Equipment: Digital standard color difference photometer AUD-CH-GV 3, manufactured by Suga Shikenki K.K.

(b) Bm

Maximum magnetic flux density measured using an external magnetic field of 3000 Oe.

Measurement Equipment: Vibration sample type magnetic flux meter (VSM-3 Model, manufactured by Toei Kogyo K.K.)

(c) Br/Bm

Measured using an external magnetic field of 3000 Oe.

Measurement Equipment: VSM-3 Model, manufactured by Toei Kogyo K.K.

(d) Durability

After recording test patterns with a standard model VTR, the patterns were reproduced in a still photographic mode and the time until change occurred on the images on a TV monitor was measured.

Measurement Equipment: AV-8700, manufactured by Sony Co., Ltd.

(e) 5 MHz Output

The output when a 5 MHz standard signal was recorded at an optimum electric current value for recording, using a standard model VTR. The value is shown as a relative value in which a CrO2 tape is made the standard. The wavelength for recording on the tape was 2.2 μm.

Measurement Equipment: AV-8700, manufactured by Sony Co., Ltd.

(f) Abrasion

Weight of the magnetic layer scraped off by the head after winding and re-winding 100 times a tape of a length of 100 m at a speed of 5.0 m/sec in a tape recorder having an imitation head having a contact length of 2 mm with the surface of the magnetic layer.

All parts, percents, ratios and the like are by weight in the examples and comparison examples hereinbelow, unless otherwise indicated.

EXAMPLE 1

In a direct current magnetic field of 1000 gausses, 1 mol/l of sodium borohidride was added to an aqueous solution containing 0.685 mol/l of ferrous sulfide, 0.305 mol/l of cobalt sulfate and 0.010 mol/l of chromium alum to obtain finely divided ferromagnetic alloy powders. The thus obtained ferromagnetic alloy powders comprised 10 to 15 particles with a diameter of 400 Å linked together and had a composition of Fe:Co:Cr being approximately 69:30:1 by weight, with 3 wt% B being also present. The coercive force and saturation magnetization of the thus-obtained ferromagnetic alloy powders were 950 Oe and 100 emu/g, respectively. After the ferromagnetic alloy powders were sufficiently dried in a vacuum of less than 20 Torr, 300 parts thereof were taken out and a magnetic recording element was produced therefrom in the manner indicated below.

|  | parts by weight |
|---|---|
| Ferromagnetic Alloy Powder | 300 |
| Polyester-Polyurethane(*) | (amount as shown in Table 1) |
| Synthetic Non-Drying Oil-Modified Alkyd Resin(**) | (amount as shown in Table 1) |
| Oleic Acid | 6 |
| Silicone Oil (dimethyl | |

|  | parts by weight |
|---|---|
| polysiloxane, polymerization degree: about 60) | 1.5 |
| Butyl Acetate | 600 |

The composition indicated above was charged in a ball mill and dispersed for 24 hours and then a polyisocyanate(***) was added thereto (in amount as shown in Table 1). The mixture was subjected to high speed shearing dispersion for an hour. Thereafter, the dispersion was filtered using a filter having an average pore size of 3 μm to thereby obtain a magnetic coating composition. The thus-obtained magnetic coating composition was coated onto a polyethylene terephthalate film having a thickness of 22 μm in a dry thickness of 3 μm. Then, an orientation treatment was carried out for 0.02 second by applying a direct current magnetic field of 2500 gauss thereto. After drying at 120° C. for 2 minutes, a super calendering roll treatment was conducted. The sample thus-obtained was slit into a width of ½ inch to obtain a video tape. The mixing ratios of the binder compositions of the present invention and the results obtained are shown in Table 1 and Table 2 below, respectively.

(*)Polyester-polyurethane: The product obtained by urethanization of a polyester, with 2,4-tolylene diisocyanate synthesized from adipic acid, and ethylene glycol, diethylene glycol and butylene glycol; weight corresponding to styrene, average molecular weight, about 130,000, manufactured by Japan Reichhold Co., Ltd., trade name Pandex T-5205.

(**)Synthetic Non-Drying Oil-Modified Alkyd Resin: Synthesized mainly from a synthetic non-drying oil-modified glycidyl ester obtained by reaction of α-dimethyldecylic acid (Koch acid) obtained from dodecene according to the Koch method, the glycidyl ester obtained by reaction of epichlorohydrin with the Koch acid, phthalic anhydride and glycerin; 70% solution in methyl isobutyl ketone and xylol mixed solvent (1:1 by vol.); oil length 29%; hydroxyl value about 130; manufactured by Japan Reichhold Co., Ltd.; trade name Burnock DE-180-70.

(***)Polyisocyanate: Adduct of 3 mols of tolylene diisocyanate and 1 mol of trimethylol propane; 75% ethyl acetate solution; NCO content about 13.3%; manufactured by Bayer A. G., trade name Desmodur L-75.

The total amount of the polyester-polyurethane, synthetic non-drying oil-modified alkyd resin and polyisocyanate used was 60 parts on a solid components basis.

TABLE 1

| Sample No. | Polyester-Polyurethane (wt. parts) | Synthetic Non-Drying Oil-Modified Alkyd Resin (wt. parts) | Polyisocyanate (wt. parts) | NCO/OH (molar ratio) |
|---|---|---|---|---|
| C-1 | 20.0 | 38.8 | 17.2 | 0.6 |
| 1 | " | 35.0 | 20.7 | 0.8 |
| 2 | " | 31.9 | 23.5 | 1.0 |
| 3 | " | 29.4 | 25.9 | 1.2 |
| 4 | " | 27.2 | 28.0 | 1.4 |
| 5 | " | 25.3 | 29.8 | 1.6 |
| 6 | " | 23.6 | 31.3 | 1.8 |
| 7 | " | 22.2 | 32.6 | 2.0 |
| C-2 | " | 20.9 | 33.8 | 2.2 |
| C-3 | 0 | 44.4 | 39.0 | 1.2 |
| 8 | 6.0 | 40.0 | 35.1 | " |
| 9 | 12.0 | 35.5 | 31.2 | " |
| 10 | 18.0 | 31.1 | 27.3 | " |
| 11 | 24.0 | 26.6 | 23.4 | " |
| 12 | 30.0 | 22.2 | 19.5 | " |
| 13 | 36.0 | 17.8 | 15.6 | " |
| 14 | 42.0 | 13.3 | 11.6 | " |
| C-4 | 48.0 | 8.9 | 7.8 | " |
| C-5 | 30.0 | — | 40.0 | — |
| C-6 | 42.0 | — | 24.0 | — |

TABLE 2

| Sample No. | Surface Gloss (a) | Bm (b) (Gauss) | Squareness Ratio (c) (Br/Bm) | Durability (d) (min) | 5 MHz Output (e) (dB) | Degree of Abrasion (f) (mg) |
|---|---|---|---|---|---|---|
| C-1 | 232 | 4080 | 0.88 | 13 | +5.3 | 5 |
| 1 | 241 | 4120 | 0.88 | 21 | +5.5 | 1 or less |
| 2 | 243 | 4110 | 0.88 | 34 | +5.7 | " |
| 3 | 254 | 4260 | 0.88 | 42 | +6.2 | " |
| 4 | 247 | 4250 | 0.88 | 38 | +6.1 | " |
| 5 | 248 | 4140 | 0.88 | 33 | +5.4 | " |
| 6 | 245 | 4100 | 0.88 | 37 | +5.6 | " |
| 7 | 236 | 4090 | 0.87 | 29 | +5.0 | 6 |
| C-2 | 222 | 3970 | 0.86 | 23 | +4.6 | 13 |
| C-3 | 261 | 4430 | 0.89 | 3 | +6.5 | 32 |
| 8 | 257 | 4310 | 0.88 | 16 | +6.3 | 7 |
| 9 | 258 | 4300 | 0.88 | 32 | +6.2 | 1 or less |
| 10 | 256 | 4260 | 0.88 | 44 | +6.3 | " |
| 11 | 250 | 4230 | 0.88 | 47 | +6.1 | " |
| 12 | 244 | 4250 | 0.88 | 43 | +6.0 | " |
| 13 | 235 | 4100 | 0.87 | 40 | +5.7 | " |
| 14 | 228 | 4060 | 0.85 | 35 | +5.1 | " |
| C-4 | 211 | 3950 | 0.83 | 26 | +4.3 | 4 |
| C-5 | 186 | 3780 | 0.81 | 7 | +2.6 | 23 |
| C-6 | 179 | 3620 | 0.80 | 4 | +2.3 | 17 |

(a), (b), (c), (d), (e) and (f) as hereinbefore described.

From Table 1 and Table 2 above, it can be understood that, since the binder composition in accordance with the present invention has a greater surface gloss value, the magnetic recording member of the present invention has an excellent smooth surface.

In addition, it can be understood that since the saturation magnetic flux density of the magnetic recording member is high and the squareness ratio thereof is large, the binder composition of the present invention provides excellent dispersibility for the finely divided ferromagnetic powders. As a result, it will be understood that the output upon recording at a short wavelength is quite excellent as compared with conventional magnetic recording members.

It can also be understood that the binder composition in accordance with the present invention provides excellent durability and is excellent in preventing the ferromagnetic powders from being scraped off.

In addition, it can be understood that the molar ratio of number of mols of isocyanato groups present in the polyisocyanate to number of mols of hydroxyl groups present in the synthetic non-drying oil modified alkyd resin of about 0.8 to 2.0, preferably 1.0 to 1.8, is desired for the binders, since the magnetic properties of the magnetic recording member are well balanced using such a range.

In addition, it can be understood tht the amount of the polyester-polyurethane present in the total amount of binder ranging from 10 to 70 wt%, particularly 20 to 40 wt%, is preferred since the magnetic properties of the magnetic recording member are well balanced in such a range.

It can further be understood that the magnetic properties of the magnetic recording member obtained, particularly the squareness ratio and the 5 MHz output, are poor when the synthetic non-drying oil-modified alkyd resin, which is an essential element in the present invention, is not employed.

EXAMPLE 2

Using the synthetic non-drying oil-modified alkyd resin described in Example 1 but having different oil length and hydroxyl value as shown below, magnetic recording members were obtained in a manner similar to that described in Example 1.

Synthetic non-drying oil-modified alkyd resin employed: oil length 39%; hydroxyl value about 105; solvent mixture of 70% methyl isobutyl ketone and xylol; manufactured by Japan Reichhold Co., Ltd., trade name Burnock DE 104-70.

The amount used and results obtained are shown in Table 3 below.

TABLE 3

| | Binder Composition | | | | Magnetic Properties | | | | | |
|---|---|---|---|---|---|---|---|---|---|---|
| Sample No. | Polyester-Polyurethane (wt. parts) | Synthetic Non-Drying Oil-Modified Alkyd Resin (wt. parts) | Polyisocyanate (wt. parts) | NCO/OH (molar ratio) | Surface Gloss (a) | Bm (b) (Gauss) | Squareness Ratio (c) (Br/Bm) | Durability (d) (min) | 5 MHz Output (e) (dB) | Degree of Abrasion (f) (mg) |
| C-7 | 20.0 | 41.3 | 14.7 | 0.6 | 231 | 3980 | 0.88 | 4 | +4.5 | 6 |
| 15 | " | 37.9 | 17.9 | 0.8 | 236 | 4070 | 0.88 | 15 | +5.1 | 1 or less |
| 16 | " | 32.4 | 23.0 | 1.2 | 243 | 4090 | 0.88 | 33 | +5.6 | " |
| 17 | " | 25.2 | 29.8 | 2.0 | 240 | 4020 | 0.88 | 24 | +5.2 | " |
| C-8 | " | 23.9 | 31.1 | 2.2 | 211 | 3740 | 0.86 | 12 | +4.0 | 11 |
| C-9 | 0.0 | 48.7 | 34.6 | 1.2 | 257 | 4320 | 0.88 | 1 | +5.9 | 14 |
| 18 | 12.0 | 38.9 | 27.6 | " | 248 | 4100 | 0.88 | 11 | +5.3 | 1 or less |
| 19 | 24.0 | 29.2 | 20.7 | " | 242 | 4160 | 0.88 | 35 | +5.6 | " |
| 20 | 36.0 | 19.5 | 13.8 | " | 229 | 4010 | 0.87 | 42 | +4.8 | " |
| C-10 | 48.0 | 9.7 | 6.9 | " | 204 | 3970 | 0.83 | 13 | +4.4 | 5 |

From the results shown in Table 3 above, it can be understood that the binder composition in accordance with the present invention is excellent in dispersibility of the finely divided ferromagnetic powders and the output of the magnetic recording member obtained upon recording at a short wavelength is large.

EXAMPLE 3

Instead of the polyester-polyurethane as described in Example 1, the polyester-polyurethane indicated below was used.

Polyester-polyurethane obtained by the reaction of mainly a polyester polyol synthesized from ethylene glycol, adipic acid and 2,4-tolylenediisocyanate; average molecular weight corresponding to styrene, about 80,000; trade name, Desmocol 400, manufactured by Bayer A. G.

The mixing ratios and results obtained are shown in Table 4.

TABLE 4

| Sample No. | Binder Composition | | | | Magnetic Properties | | | | | |
|---|---|---|---|---|---|---|---|---|---|---|
| | Polyester-Polyurethane (wt. parts) | Synthetic Non-Drying Oil-Modified Alkyd Resin (wt. parts) | Polyisocyanate (wt. parts) | NCO/OH (molar ratio) | Surface Gloss (a) | Bm (b) (Gauss) | Squareness Ratio (c) (Br/Bm) | Durability (d) (min) | 5 MHz Output (e) (dB) | Degree of Abrasion (f) (mg) |
| 21 | 20.0 | 29.4 | 25.9 | 1.2 | 262 | 4230 | 0.89 | 35 | +6.0 | 1 or less |
| 22 | 20.0 | 25.3 | 29.8 | 1.6 | 258 | 4170 | 0.89 | 26 | +5.7 | " |
| 23 | 12.0 | 35.5 | 31.2 | 1.2 | 264 | 4370 | 0.89 | 27 | +6.3 | " |
| 24 | 24.0 | 26.6 | 23.4 | 1.2 | 253 | 4260 | 0.89 | 33 | +6.1 | " |

From the results shown in Table 4 above, it can be understood that the binder composition in accordance with the present invention provides excellent dispersibility of the finely divided ferromagnetic powders and the output upon recording at a short wavelength is large as in Example 1 even though the polyester-polyurethane was varied.

EXAMPLE 4

Instead of the polyisocyanate described in Example 1, the polyisocyanate indicated below was used. Magnetic recording members were obtained in a manner similar to Example 1.

Polyisocyanate employed: Compound obtained by decarboxylation from 3 moles of hexamethylene diisocyanate and 1 mol of water; 75 wt% solution in an ethylene glycol acetatexylene mixed solvent (1:1 by volume); NCO content about 16.5%; trade name Desmodur N-75, manufactured by Bayer A. G.

The amounts employed and results obtained are shown in Table 5.

COMPARISON EXAMPLE 1

Instead of the synthetic non-drying oil-modified alkyd resin described in Example 1, a castor oil-modified alkyd resin was employed. Magnetic recording members were prepared in a manner similar to Example 1.

Castor Oil-Modified Alkyd Resin: oil length 25%; hydroxyl value, about 140; 70% ethyl acetate solution; trade name Burnock J-517, manufactured by Japan Reichhold Co., Ltd.

The amounts employed and measurement results obtained are shown in Table 6 below.

TABLE 6

| Sample No. | Binder Composition | | | | Magnetic Properties | | | | | |
|---|---|---|---|---|---|---|---|---|---|---|
| | Polyester-Polyurethane (wt. parts) | Castor Oil-Modified Alkyd Resin (wt. parts) | Polyisocyanate (wt. parts) | NCO/OH (molar ratio) | Surface Gloss (a) | Bm (b) (Gauss) | Squareness Ratio (c) (Br/Bm) | Durability (d) (min) | 5 MHz Output (e) (dB) | Degree of Abrasion (f) (mg) |
| C-11 | 20.0 | 28.4 | 26.8 | 1.2 | 231 | 4050 | 0.85 | 27 | +5.0 | 1 or less |
| C-12 | 20.0 | 24.3 | 30.6 | 1.6 | 226 | 3920 | 0.85 | 21 | +4.6 | 2 |
| C-13 | 12.0 | 34.0 | 32.2 | 1.2 | 232 | 4010 | 0.85 | 24 | +4.9 | 2 |
| C-14 | 24.0 | 25.5 | 24.1 | 1.2 | 230 | 4000 | 0.85 | 32 | +4.8 | 1 or less |

From the results shown in Table 6, it will be understood that the binder composition using the natural aliphatic acid (oil) modified alkyd resin provides inferior magnetic properties, particularly squareness ratio and 5 MHz output, to the binder composition in accordance with the present invention in which synthetic non-drying oil modified alkyd resin is used.

TABLE 5

| Sample No. | Binder Composition | | | | Magnetic Properties | | | | | |
|---|---|---|---|---|---|---|---|---|---|---|
| | Polyester-Polyurethane (wt. parts) | Synthetic Non-Drying Oil-Modified Alkyd Resin (wt. parts) | Polyisocyanate (wt. parts) | NCO/OH (molar ratio) | Surface Gloss (a) | Bm (b) (Gauss) | Squareness Ratio (c) (Br/Bm) | Durability (d) (min) | 5 MHz Output (e) (dB) | Degree of Abrasion (f) (mg) |
| 25 | 20.0 | 32.5 | 23.1 | 1.2 | 257 | 4000 | 0.88 | 38 | +5.6 | 1 or less |
| 26 | 20.0 | 28.4 | 26.9 | 1.6 | 250 | 4140 | 0.88 | 31 | +5.3 | " |
| 27 | 12.0 | 38.9 | 27.6 | 1.2 | 254 | 4080 | 0.88 | 27 | +5.5 | " |
| 28 | 24.0 | 29.2 | 20.7 | 1.2 | 246 | 4090 | 0.88 | 35 | +5.4 | " |

It can be understood from the results shown in Table 5 above that the binder composition in accordance with the present invention provides excellent dispersibility of the finely divided ferromagnetic powders and the output upon recording at a short wavelength is large as in Example 1 even if the polyisocyanate is varied.

COMPARISON EXAMPLE 2

Instead of the synthetic non-drying oil modified alkyd resin described in Example 1, a coconut oil modified alkyd resin was used and magnetic recording members were obtained in a manner similar to Example 1.

Coconut Oil Modified Alkyd Resin: oil length 26%; hydroxyl value, about 150; 70% butyl acetate solution;

trade name Burnock ODE-160, manufactured by Japan Reichhold Co., Ltd.

The amounts employed and measurement results obtained are shown in Table 7 below.

ibility of the finely divided ferromagnetic powders, the Bm value is low and particularly the squareness ratio is low. It can also be understood that as a result, the 5 MHz output is poor. Further, it can be seen that the

TABLE 7

| Sample No. | Binder Composition | | | NCO/OH (molar ratio) | Magnetic Properties | | | | | |
|---|---|---|---|---|---|---|---|---|---|---|
| | Polyester-Polyurethane (wt. parts) | Coconut Oil-Modified Alkyd Resin (wt. parts) | Polyiso-cyanate (wt. parts) | | Surface Gloss (a) | Bm (b) (Gauss) | Squareness Ratio (c) (Br/Bm) | Durability (d) (min) | 5 MHz Output (e) (dB) | Degree of Abrasion (f) (mg) |
| C-15 | 20.0 | 27.3 | 27.8 | 1.2 | 222 | 3940 | 0.84 | 25 | +4.6 | 2 |
| C-16 | 20.0 | 23.3 | 31.6 | 1.6 | 225 | 3980 | 0.84 | 21 | +4.5 | 3 |
| C-17 | 12.0 | 32.8 | 33.4 | 1.2 | 231 | 4090 | 0.84 | 26 | +4.5 | 2 |
| C-18 | 24.0 | 24.6 | 25.0 | 1.2 | 226 | 3920 | 0.84 | 32 | +4.0 | 1 or less |

It can be understood from the results in Table 7 that as in Comparison Example 1, a binder composition in which a coconut(natural aliphatic acid)oil modified alkyd resin is employed provides a particularly poor squareness ratio and a 5 MHz output as compared with the binder composition in accordance with the present invention in which a synthetic non-drying oil modified alkyd resin is employed.

COMPARISON EXAMPLE 3

Instead of the synthetic non-drying oil modified alkyd resin described in Example 1, vinyl chloride-vinyl acetate copolymer (87:13 molar copolymerization ratio; polymerization degree, 420; trade name VYHH, manufactured by UCC CO., Ltd.) was employed and magnetic recording members were obtained in a manner similar to Example 1.

The amounts employed and measurement results obtained are shown in Table 8 below.

durability as well as the degree of abrasion are poor.

COMPARISON EXAMPLE 4

Instead of the synthetic non-drying oil-modified alkyd resin described in Example 1, a branched polyester (trade name Desmophen 800, manufactured by Bayer A. G.; hydroxyl value, about 290) synthesized by reaction of trimethylol propane, glycerin, ethylene, glycol, with adipic acid, phthalic acid, was used and magnetic recording members were prepared in a manner similar to Example 1.

The amounts employed and measurement results obtained are shown in Table 9 below.

TABLE 9

| Sample No. | Binder Composition | | | NCO/OH (molar ratio) | Magnetic Properties | | | | | |
|---|---|---|---|---|---|---|---|---|---|---|
| | Polyester-Polyurethane (wt. parts) | Branched Polyester (wt. parts) | Polyiso-cyanate (wt. parts) | | Surface Gloss (a) | Bm (b) (Gauss) | Squareness Ratio (c) (Br/Bm) | Durability (d) (min) | 5 MHz Output (e) (dB) | Degree of Abrasion (f) (mg) |
| C-23 | 20.0 | 16.2 | 31.8 | 1.2 | 161 | 3320 | 0.80 | 15 | +0.2 | 8 |
| C-24 | 20.0 | 13.5 | 35.4 | 1.6 | 173 | 3410 | 0.81 | 21 | +0.5 | 7 |
| C-25 | 12.0 | 19.4 | 38.2 | 1.2 | 159 | 3300 | 0.80 | 26 | −0.4 | 10 |
| C-26 | 24.0 | 14.5 | 28.5 | 1.2 | 170 | 3560 | 0.82 | 13 | +1.1 | 7 |

From the results shown in Table 9, it can be understood that with the binder composition in which a conventional branched polyester polyol was used, all of the magnetic properties, particularly the squareness ratio and 5 MHz output, were quite poor, as compared with the binder composition in accordance with the present

TABLE 8

| Sample No. | Binder Composition | | | Magnetic Properties | | | | | |
|---|---|---|---|---|---|---|---|---|---|
| | Polyester-Polyurethane (wt. parts) | Vinyl Chloride-Vinyl Acetate Copolymer (wt. parts) | Poly-isocyanate (wt. parts) | Surface Gloss (a) | Bm (b) (Gauss) | Squareness Ratio (c) (Br/Bm) | Durability (d) (min) | 5 MHz Output (e) (dB) | Degree of Abrasion (f) (mg) |
| C-19 | 20 | 20.6 | 25.9 | 189 | 3840 | 0.83 | 9 | +3.2 | 6 |
| C-20 | 20 | 17.7 | 29.8 | 182 | 3610 | 0.83 | 10 | +3.0 | 7 |
| C-21 | 12.0 | 24.6 | 31.2 | 187 | 3850 | 0.83 | 6 | +3.0 | 13 |
| C-22 | 24.0 | 18.5 | 23.4 | 194 | 3760 | 0.83 | 12 | +3.5 | 4 |

It can be understood from the results shown in Table 8 that a binder composition in which a conventional vinyl chloride-vinyl acetate copolymer is employed provides inferior smoothness for the magnetic recording members and, therefore, the surface gloss value thereof is poor, as compared with the binder composition in accordance with the present invention. In addition, it can also be understood that due to poor dispersinvention.

COMPARISON EXAMPLE 5

Instead of the synthetic non-drying oil-modified alkyd resin described in Example 1, a linear polyester polyol (trade name Desmophen 1700, manufactured by Bayer A. G.; hydroxyl value, about 40) synthesized by reaction of ethylene glycol, diethylene glycol and adipic acid was employed and magnetic recording members were obtained in a manner similar to Example 1.

The amounts employed and measurement results obtained are shown in Table 10 below.

TABLE 10

| Sample No. | Binder Composition | | | | Magnetic Properties | | | | | |
|---|---|---|---|---|---|---|---|---|---|---|
| | Polyester-Polyurethane (wt. parts) | Liner Polyester (wt. parts) | Polyiso-cyanate (wt. parts) | NCO/OH (molar ratio) | Surface Gloss (a) | Bm (b) (Gauss) | Squareness Ratio (c) (Br/Bm) | Durablity (d) (min) | 5 MHz Output (e) (dB) | Degree of Abrasion (f) (mg) |
| C-27 | 20.0 | 33.2 | 9.0 | 1.2 | 192 | 3870 | 0.83 | 6 | +2.6 | 13 |
| C-28 | 20.0 | 31.5 | 11.4 | 1.6 | 208 | 3880 | 0.83 | 5 | +3.1 | 11 |
| C-29 | 12.0 | 39.9 | 10.8 | 1.2 | 203 | 3850 | 0.83 | 5 | +2.5 | 16 |
| C-30 | 24.0 | 29.9 | 8.1 | 1.2 | 191 | 3740 | 0.82 | 7 | +2.3 | 9 |

From the results shown in Table 10, it can be understood that with the binder composition in which a conventional linear polyester polyol was used, all of the magnetic properties, particularly the squareness ratio and durability as well as 5 MHz output, are quite poor to the binder composition in accordance with the present invention.

COMPARISON EXAMPLE 6

Instead of the synthetic non-drying oil-modified alkyd resin described in Example 1, trimethylol propane (hydroxyl value, about 1280) was employed and procedures similar to Example 1 were repeated in an attempt to obtain magnetic recording members. However, gelation began to occur immediately after the polyisocyanate was added so that the composition could not be coated onto the polyethylene terephthalate film.

The amounts employed are shown in Table 11 below.

TABLE 11

| Sample No. | Binder Composition | | | | Magnetic Properties |
|---|---|---|---|---|---|
| | Polyester-Polyurethane (wt. parts) | Trimethylol Propane (wt. parts) | Polyiso-cyanate (wt. parts) | NCO/OH (molar ratio) | |
| C-31 | 20.0 | 5.3 | 46.1 | 1.2 | Impossible to measure due to gelation of the magnetic coating composition. |
| C-32 | 20.0 | 4.1 | 47.8 | 1.6 | |
| C-33 | 12.0 | 6.4 | 55.7 | 1.2 | |
| C-34 | 24.0 | 4.8 | 41.8 | 1.2 | |

From the above, it can be understood that the use of conventional polyols is not suitable in a binder composition for magnetic recording members because the reaction of such polyols and polyisocyanates is too fast.

EXAMPLE 5

The magnetic recording members obtained in Examples 1 through 4 and Comparison Examples 1 through 5 were stored for a week at 60° C. under 90% RH for accelerated testing of the durability after storage.

The Sample Nos. of the tapes employed and magnetic properties thereof are shown in Table 12 below.

TABLE 12

| Sample No. | Bm (b) | | Demagnetization Rate (%) |
|---|---|---|---|
| | Before Storage (Gauss) | After Storage (Gauss) | |
| 3 | 4260 | 3980 | −6.6 |
| 16 | 4090 | 3850 | −5.9 |

TABLE 12-continued

| Sample No. | Bm (b) | | Demagnetization Rate (%) |
|---|---|---|---|
| | Before Storage (Gauss) | After Storage (Gauss) | |
| 22 | 4170 | 3920 | −6.0 |
| 26 | 4140 | 3860 | −6.8 |
| C-11 | 4050 | 3650 | −10.0 |
| C-15 | 3940 | 3560 | −9.6 |
| C-19 | 3840 | 3090 | −19.5 |
| C-23 | 3320 | 2930 | −11.7 |
| C-27 | 3870 | 3370 | −12.9 |

From the results shown in Table 12 above, it can be understood that the binder composition in accordance with the present invention prevents the Bm from deteriorating due to oxidation of the finely divided ferromagnetic alloy powders.

From the examples and the comparison examples shown above, it can be understood that the binder composition in accordance with the present invention is quite excellent as compared with conventional binder compositions.

By the use of the binder composition in accordance with the present invention, high density magnetic recording of high quality can be obtained even if finely divided ferromagnetic alloy powders are employed as finely divided ferromagnetic powders.

While the invention has been described in detail and with reference to specific embodiments thereof, it will be apparent to one skilled in the art that various changes and modifications can be made therein without departing from the spirit and scope thereof.

What is claimed is:

1. A magnetic recording member comprising a nonmagnetic support having thereon a magnetic layer comprising finely divided ferromagnetic powders dispersed in a binder,
said binder comprising about 10 to about 70 wt% of (a) a polyester-polyurethane resin and about 30 to about 90 wt% of (b) a synthetic non-drying oil-modified alkyd resin having a hydroxyl value of from about 50 to about 200 and (c) a polyisocyanate, wherein the molar ratio of the isocyanate groups present in the polyisocyanate (c) to the hydroxyl groups present in the synthetic non-drying oil-modified alkyd resin (b) ranges from about 0.8:1 to about 2.0:1.

2. The magnetic recording member as claimed in claim 1, wherein said synthetic non-drying oil-modified alkyd resin is a branched chain alkyl monocarboxylic acid glycidyl ester modified alkyd resin.

3. The magnetic recording member as claimed in claim 1, wherein said polyisocyanate (c) is an adduct of a diisocyanate and a trihydric polyol, a pentamer of a diisocyanate, or a decarboxylation product obtained by reacting 3 mols of a diisocyanate and 1 mol of water.

4. The magnetic recording member as claimed in claim 1, wherein the molar ratio of the isocyanate groups present in said polyisocyanate (c) to the hydroxyl groups present in said synthetic non-drying oil-modified alkyd resin (b) ranges from about 1.0:1 to about 1.8:1.

5. The magnetic recording member as claimed in claim 1, wherein the proportion of said polyester-polyurethane (a) ranges from about 20 to about 40 wt% to the total amount of said binder.

6. The magnetic recording member as claimed in claim 1, wherein said finely divided ferromagnetic powders are finely divided ferromagnetic alloy powders.

7. The magnetic recording member as claimed in claim 6, wherein said finely divided ferromagnetic alloy powders are finely divided liquid phase reduction type ferromagnetic alloy powders.

8. The magnetic recording member as claimed in claim 1, wherein said synthetic non-drying oil is a paraffin oxidized aliphatic carboxylic acid, a Ziegler aliphatic carboxylic acid, an oxo aliphatic carboxylic acid or a Koch aliphatic carboxylic acid.

9. The magnetic recording member as claimed in claim 8, wherein said Koch aliphatic carboxylic acid is obtained using the Koch process by adding CO to an olefin in the presence of an acid catalyst.

* * * * *